INVENTORS.
MONROE M. SOLOMKA
ENRIQUE RENTERIA AGUIRRE

BY *Hugo E. Weisberger*
ATTORNEY

United States Patent Office 3,706,829
Patented Dec. 19, 1972

3,706,829
AUTOMATED PROCESS FOR THE HYDROLYSIS
OF TITANIUM SULFATE SOLUTIONS
Monroe M. Solomka, Bilbao, and Enrique Renteria
Aguirre, Plencia, Spain, assignors to Dow-Unquinesa
S.A., Erandio, Bilbao, Spain
Filed Nov. 19, 1970, Ser. No. 91,039
Claims priority, application Spain, Nov. 22, 1969, 373,807
Int. Cl. C01g 23/06
U.S. Cl. 423—615
18 Claims

ABSTRACT OF THE DISCLOSURE

The hydrolysis of titanium sulfate solutions is performed and controlled by heating a seeded titanium sulfate solution with agitation while simultaneously measuring the reflectance of the resulting suspension, until a critical point is attained as indicated by a substantial change in the rate of reflectance per unit of hydrolysis time, allowing the solution to remain quiescent for from 5 to 60 minutes, then resuming the heating of the solution until the hydrolysis produces the desired yield of titanium hydrate. The measurement of reflectance may be made by photoelectric means, and the point of inflection of the reflectance curve or its first or second derivative with respect to time may be used to control the hydrolysis process.

BACKGROUND OF THE INVENTION

Figure 1:
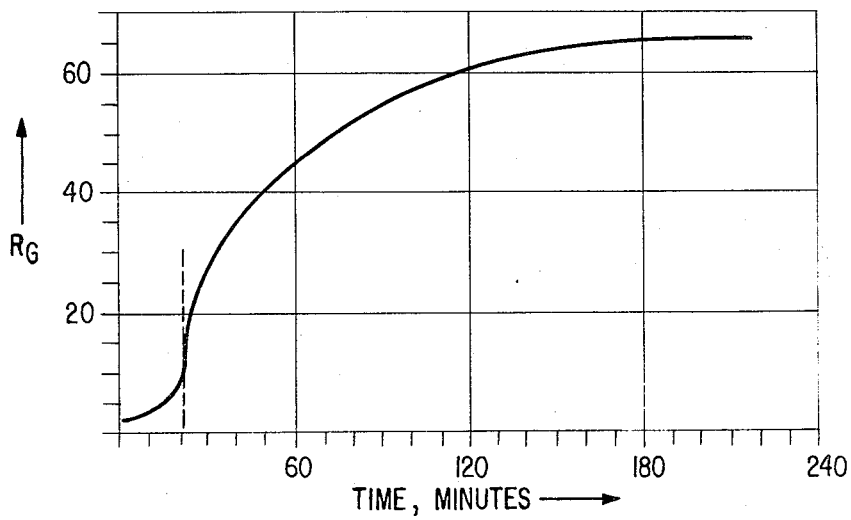

In the sulfate process for the manufacture of titanium dioxide pigments dried ilmenite is finely ground, and reacted with concentrated sulfuric acid. The reaction mass is dissolved, the ferric ions and a small part of the titanium are reduced to the ferrous and titanous forms respectively with scrap iron. The clarified titanium sulfate solution is cooled to remove part of the ferrous sulfate by crystallization. The mother liquor is concentrated and hydrolyzed by dilution and boiling in one of the most critical steps of the process.

The aforementioned concentrated solution is metastable, tending to hydrolyze producing a titanium metahydrate. Dilution and higher temperatures favor this hydrolysis and, thus, in practice, this operation is usually carried out at or near the boiling point. It is also usual to dilute the hydrolyzing solution in order to obtain a good yield.

The nucleation of the titanium solution prior to or during hydrolysis is another factor important in the obtention of a hydrate which will produce a titanium dioxide of good pigmentary properties. Hydrolysis seed nuclei may be prepared separately. Many such techniques are described in the patent literature, e.g. U.S. Pat. No. 2,886,415. Another procedure consists in carrying out the hydrolysis process in such a way that an autonucleation occurs, e.g. the concentrated solution of 90–100° C. is slowly added to hot water (90–100° C.). An initial turbidity in the water at the start of the addition is rapidly dissolved in the mixture as the addition continues. The dissolution is only apparent; in reality, the precipitate is dispersed in the mixture acting as micelles or seed centers onto which the hydrate is subsequently precipitated during the hydrolysis process. The precipitated hydrate is extremely fine, in the order of a hundredth of a micron, but further boiling induces an agglomeration and the final metahydrate thus becomes filterable so that impurities may be removed by washing.

When the hydrolysis is carried out in the laboratory, a period of induction will be observed initially, thereafter turbidity increases slowly forming colloidal hydrate. Experience has demonstrated that once a certain amount of colloid is present, as noted by the color tone of the hydrolyzing solution, it is desirable to stop the agitation and heating for a period of time. This markedly improves the filterability of the final hydrate. After this period of repose the solution is boiled once again and slowly diluted so that the desired yield can be obtained. It is evident that the process is tedious and its control completely subjective.

In practice, the hydrolysis is carried out in large completely closed tanks making impossible to close observance of the operation except by the obviously inadequate technique of periodically sampling the batch. Thus, the hydrolysis rate cannot really be controlled, complicating control during calcination and giving rise to variations in quality of the finished pigment.

GENERAL DESCRIPTION OF THE INVENTION

We have discovered that the hydrolysis operation can be made constant by an extremely simple technique.

In general our discovery consists in the nucleation of the concentrate solution by autonucleation or by separately prepared seed as previously described and subsequent heating as usual. The progress of the entire operation is followed by means of a photoelectric cell that measures the reflectance or more specifically, the luminous directional reflectance of the solution. Any of the filters of an ordinary tristimulus reflectance meter can be used but we prefer the green filter. The terms "tristimulus reflectance" and "luminous directional reflectance" are both well established in the art, and their definition and means of measurement are given as ASTM Designation: D 307–44 (issued 1944) published in ASTM Standards 1961, Part 8, pages 933–940 inclusive. In the laboratory, we have used with success to demonstrate our technique the "Colormaster" differential colorimeter manufactured by Manufacturers Engineering and Equipment Corp. of the U.S. although this instrument, because of its particular design, is not suited for continuous measurements. The "Colormaster" differential colorimeter is recognized as a standard means of measuring reflectance and its use is fully described in ASTM Designation: D 1536–58 T (issued 1958), published in ASTM Standards 1961, Part 8, pages 877–880 inclusive. For industrial control we prefer an instrument having a measuring head provided with integral illumination. An example of such a unit is the "Search Unit Y" of the Photovolt Corp. of the U.S.A.

Figure 2:
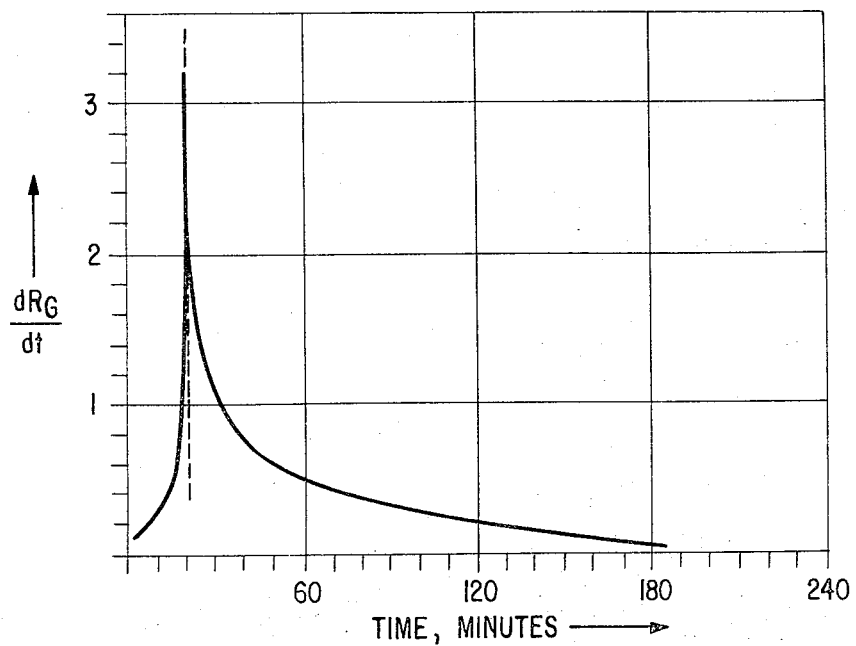
Figure 4:
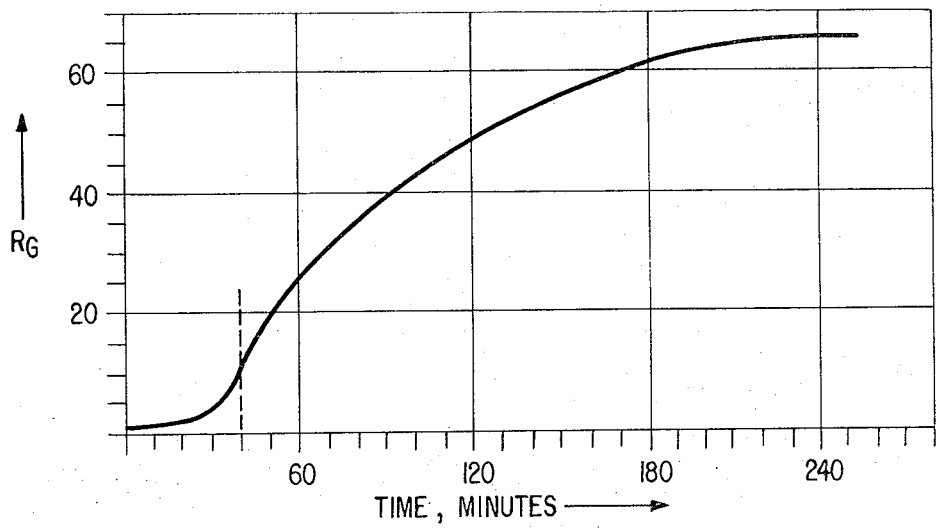
Figure 5:
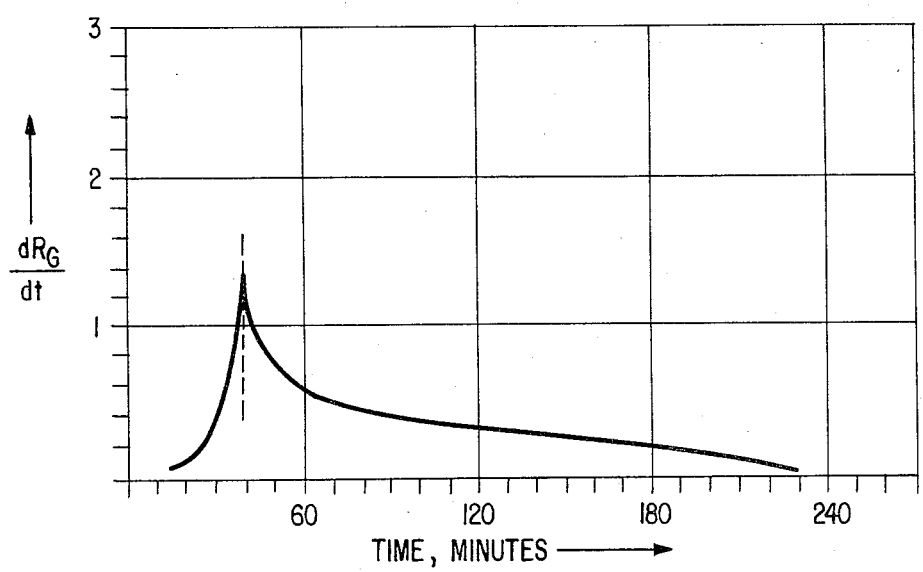

In the accompanying drawings, FIGS. 1 and 4 illustrate the variation in green reflectance of hydrolyzing slurry of Examples 1 and 2 (later described) as a function of hydrolysis time. A pronounced point of inflection is evident in each case. FIGS. 2 and 5 show the results of the instrumental differentiation of the curves in FIGS. 1 and 4. These curves, thus, represent the rate of change of reflectance (rate with respect to hydrolysis time). This value reaches a maximum and then decreases eventually reaching zero indicating that the hydrolysis has stopped and maximum yield has been obtained. We have discovered that the point of inflection of the reflectance curves, e.g. in FIGS. 1 and 4, or what amounts to the same thing, the maximum of the curves in FIGS. 2 and 5, is precisely the critical point of the process. The ideal moment for the "stop-agitation" step is that corresponding to the critical point although in certain cases for special effects the actual "stop-agitation" step may be delayed a fixed amount of time measured from this point.

Similarly, this critical point fixes a definite starting point for the steps of the operation that follow: agitation cycle, heating cycle, dilution, etc. Moreover, the dilution step, necessary for high yields, may be at a constant rate, i.e. linear with time or maybe carried out in function of the derivative of reflectance with respect to time, or in other words as a function of the hydrate surface in contact with the hydrolyzing liquor (in essence the amount of titanium already hydrolyzed).

Figure 3:
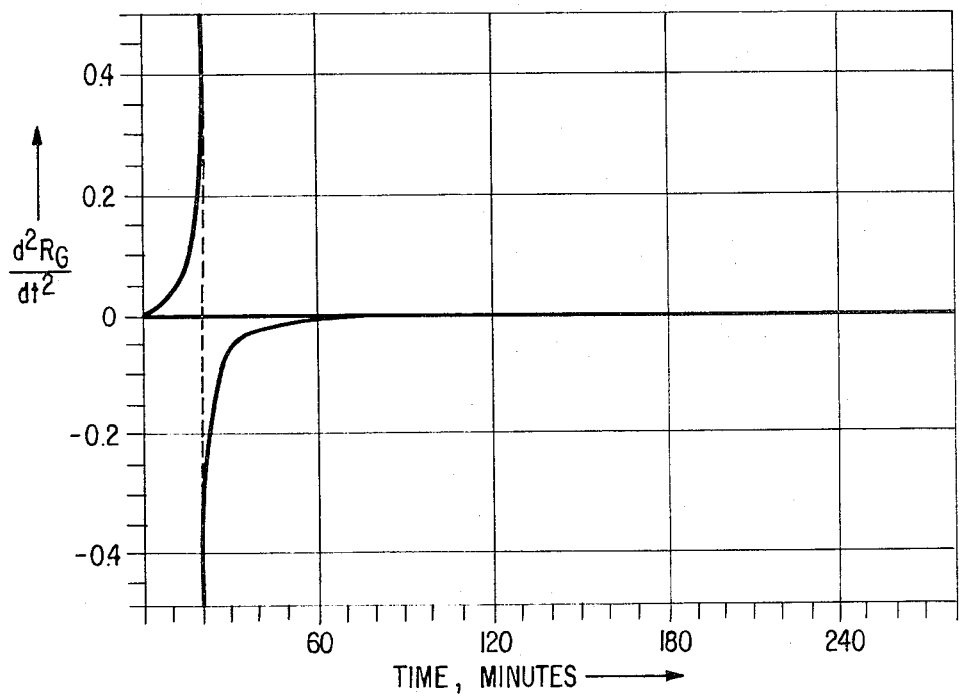
Figure 6:
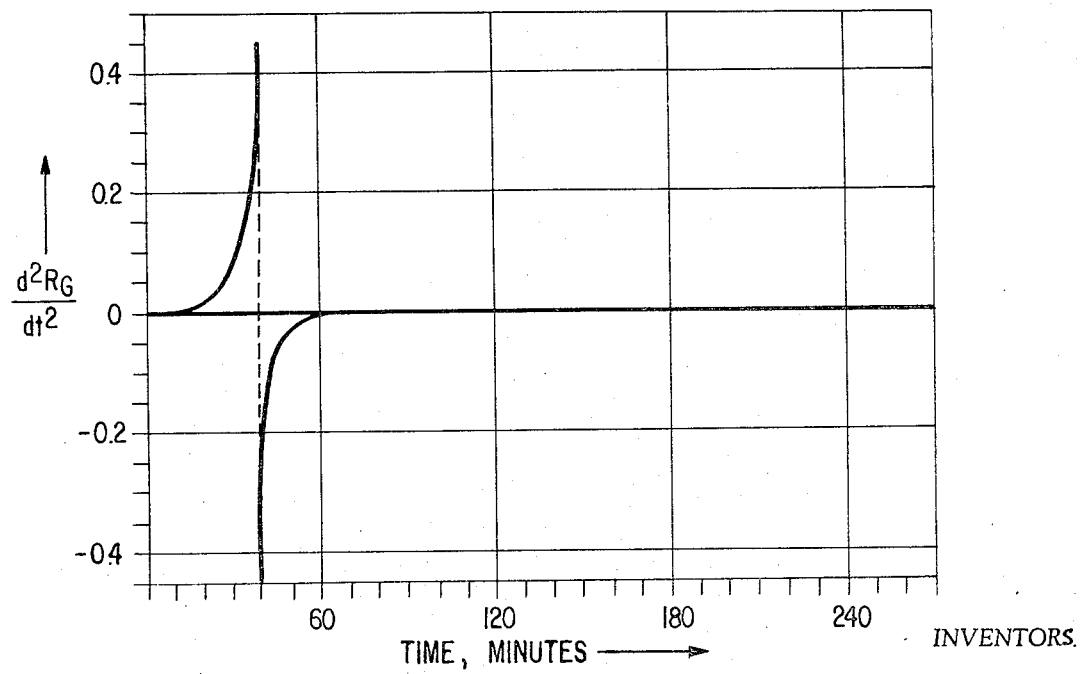

The instrumental derivative of the curves of FIGS. 2 and 5 (thus the second derivative of the reflectance with respect to time) is shown in FIGS. 3 and 6. At the critical point there is a brisk change in control current which can be used to actuate an automatic controller which in turn (with or without time-delay) can stop agitation and heating and put into operation the entire cycle of operations desired for the rest of the process.

In industrial practice an agitated steam-heated tank is usually used. To measure the reflectance of the hydrolyzing slurry, the side of the tank may be fitted with a sight glass preferably flush with the interior lining of the vessel to avoid pockets of solution.

A better technique is to connect a heat-resistant glass cell to the side of the vessel in such a way that the slurry can be circulated through the cell by natural convection, by the mechanical action of the agitator, or by means of a small circulation pump. With the latter higher circulation velocities are obtained so that deposition on the cell walls is less and frequency of cleaning is reduced.

Accordingly, the present invention provides a process for the controlled hydrolysis of titanium sulfate solutions for the production of titanium hydrate of pigment quality, which process may be automated and performed on a continuous basis. The process comprises the steps of (a) seeding a titanium sulfate solution by autonucleation or by adding separately prepared titanium hydrolysis seed, (b) hydrolyzing the seeded titanium sulfate solution by heating and agitating the solution while simultaneously measuring the reflectance of the solution, until a critical point is attained as indicated by achieving a point of inflection in a curve of the reflectance values, (c) discontinuing the heating and agitation for a period from about 5 to about 60 minutes, and (d) resuming and continuing the heating of the solution until the hydrolysis has produced the desired yield.

Advantageously, the concentration of the starting titanium sulfate solution will range from about 100 to about 300 grams per liter (expressed as $TiO_2$), and preferably from about 100 to 180 grams per liter. The solution should contain sufficient free sulfuric acid, free and that combined with the titanium, to maintain a weight ratio of $H_2SO_4/TiO_2$ between about 1.5 and about 2.5.

The seeding of the starting titanium sulfate solution may be carried out either by autonucleation or by the addition of separately prepared seed, in accordance with conventional practice.

Ordinarily the seeded solution is brought to its boiling point (above 100° C.) and boiled until the critical reflectance value is reached. However, the hydrolysis at this stage of the process may also be performed at temperatures slightly below the boiling point, e.g. between about 90° and about 100° C. The heating in the subsequent hydrolysis stage or stages may also be carried out either at the boiling temperature, or at the temperature range of 90°–100° C., and at the same concentration, but preferably the hydrolysis is continued with a simultaneous dilution of the suspension to a concentration between about 140 to 180 grams per liter $TiO_2$.

If desired, the intermediate quiescent period of no agitation following attainment of the critical reflectance value, may be omitted. As mentioned previously, the course of the hydrolysis is followed and controlled, in accordance with the invention, by means of photoelectric measurements of the solution or suspension, using a suitable filter. By plotting the reflectance values the critical point is determined as a point of inflection in the curve. By employing instrumental differentiation, the first or second derivative of reflectance with respect to time may be used to control the process.

DESCRIPTION OF THE PREFERRED EMBODIMENTS

The following examples serve to illustrate the practice of the invention, but are not to be regarded as limiting:

Example 1

A solution of the following characteristics is hydrolyzed by the autonucleation technique:

| | |
|---|---|
| Density | 1.666 |
| Total $TiO_2$ g.p.l. | 239 |
| $H_2SO_4/TiO_2$ | 1.825 |
| $FeSO_4/TiO_2$ | 0.94 |
| $Ti^{+++}$ (as $TiO_2$) g.p.l. | 2.52 |

HYDROLYSIS CONDITIONS

| | |
|---|---|
| Ratio of solution to water for autonucleation | 4 |
| Solution temperature ° C. | 96 |
| Water temperature ° C. | 96 |

Following the nucleation step the mixture is brought to a boil in 20 minutes. At the critical point (after 21 minutes of boiling, see Table 1 and FIGS. 1, 2 and 3), the agitation and heating is stopped for a half an hour. The suspension is then boiled for 3 hours, diluting it at a uniform rate to 155 g.p.l. $TiO_2$ starting 1 hour after the critical point has been reached. The finished hydrolysis was filtered and the metahydrate washed, treated with $K_2SO_4$ and calcined in the usual way. A pigment of excellent quality was obtained.

Example 2

A solution of the following characteristics was hydrolyzed as in Example 1:

| | |
|---|---|
| Density | 1.659 |
| $TiO_2$ total g.p.l. | 248.5 |
| $H_2SO_4/TiO_2$ | 1.84 |
| $FeSO_4/TiO_2$ | 0.82 |
| $Ti^{+++}$ (as $TiO_2$) g.p.l. | 3.73 |

After nucleation the mixture was brought to a boil in 20 minutes and simmered until the critical point was reached (39 minutes, see Table 2 and FIGS. 4, 5 and 6). The rest of the operation was identical to that of Example 1. Although the induction period (time to reach the critical point) was much longer in this case (39 minutes vs. 21 minutes) a pigment of excellent quality was likewise obtained, practically identical to that obtained in Example 1.

In 20 operations carried out as in above examples or varying the heating temperatures, "stop-agitation" times, and dilution rate, a great uniformity in quality of the pigments obtained was observed in contrast to products obtained by former techniques.

TABLE 1

| Time, min. | Temperature, ° C. | Reflectances | | | Adams parameter L | Color visual appreciation |
|---|---|---|---|---|---|---|
| | | Green | Red | Blue | | |
| 0 | 109 | 1.74 | 1.64 | 1.83 | 13.43 | Black. |
| 7 | 110 | 2.46 | 2.40 | 2.40 | 17.18 | Do. |
| 12 | 110 | 3.66 | 3.54 | 3.49 | 21.96 | Black-grey. |
| 17 | 110 | 5.86 | 5.84 | 5.06 | 28.35 | Dark grey. |
| 20 | 110 | 8.75 | 8.67 | 6.72 | 34.54 | Grey. |
| 22 | 110 | 13.96 | 12.90 | 8.61 | 39.93 | Do. |
| 27 | 110 | 22.29 | 23.68 | 16.22 | 52.70 | Light grey. |
| 32 | 110 | 28.49 | 30.35 | 21.21 | 58.63 | Tan. |
| 37 | 109 | 32.16 | 34.00 | 24.40 | 61.77 | Tan. |
| 42 | 109 | 36.04 | 37.91 | 28.19 | 64.88 | Tan. |
| 47 | 109 | 38.84 | 40.74 | 30.76 | 66.98 | Tan. |
| 52 | 109 | 41.78 | 43.47 | 34.04 | 69.11 | Tan. |
| 69 | 109 | 46.38 | 48.28 | 38.36 | 72.24 | Tan. |
| 82 | 109 | 51.97 | 53.59 | 44.46 | 75.80 | Tan. |
| 100 | 108 | 57.21 | 58.61 | 48.37 | 78.90 | Tan. |
| 125 | 108 | 62.04 | 63.97 | 52.67 | 81.65 | Tan. |
| 150 | 108 | 64.10 | 66.32 | 54.50 | 82.87 | Tan. |
| 175 | 108 | 65.64 | 68.12 | 54.80 | 83.54 | Tan. |
| 200 | 108 | 65.52 | 70.44 | 54.72 | 83.50 | Tan. |

TABLE 2

| Time, min. | Temperature, °C. | Reflectances | | | Adams parameter L | Color visual appreciation |
|---|---|---|---|---|---|---|
| | | Green | Red | Blue | | |
| 0 | 109 | 1.27 | 1.30 | 1.33 | 10.42 | Black. |
| 5 | 109 | 1.30 | 1.36 | 1.36 | 10.63 | Do. |
| 10 | 109 | 1.39 | 1.43 | 1.45 | 11.25 | Do. |
| 15 | 109 | 1.57 | 1.57 | 1.68 | 12.41 | Do. |
| 20 | 109 | 1.79 | 1.81 | 1.85 | 12.72 | Do. |
| 25 | 109 | 2.30 | 2.30 | 2.36 | 16.42 | Do. |
| 30 | 109 | 3.56 | 3.54 | 3.55 | 21.61 | Dark grey. |
| 35 | 109 | 6.54 | 6.96 | 5.02 | 29.96 | Do. |
| 38 | 109 | 9.32 | 9.67 | 7.35 | 35.58 | Grey. |
| 40 | 109 | 11.90 | 12.64 | 9.56 | 39.84 | Do. |
| 45 | 109 | 15.84 | 16.80 | 12.90 | 45.34 | Grey-tan. |
| 50 | 109 | 19.66 | 20.85 | 15.88 | 49.88 | Tan. |
| 60 | 109 | 25.96 | 27.38 | 21.50 | 56.32 | Tan. |
| 70 | 109 | 31.23 | 32.67 | 26.32 | 6.100 | Tan. |
| 80 | 109 | 35.86 | 37.42 | 31.47 | 64.37 | Tan. |
| 100 | 108 | 42.52 | 44.66 | 38.16 | 69.61 | Tan. |
| 125 | 108 | 49.81 | 51.95 | 45.73 | 74.47 | Tan. |
| 150 | 108 | 56.01 | 58.41 | 51.35 | 78.23 | Tan. |
| 200 | 108 | 63.98 | 66.32 | 59.16 | 82.68 | Tan. |
| 250 | 108 | 64.08 | 67.21 | 60.02 | 82.75 | Tan. |

What is claimed is:

1. Process for the automatic control of the hydrolysis of a titanium sulfate solution for the production of titanium hydrate of pigment quality by means of reflectance measurements and the detection of a critical point which corresponds to the point of inflection of a reflectance-time curve, comprising the steps of:
   (a) seeding a titanium sulfate solution by autonucleation or by adding separately prepared titanium hydrolysis seed;
   (b) hydrolyzing the seeded titanium sulfate solution by heating the solution while simultaneously measuring the luminous directional reflectance of the solution by photoelectric means, until a critical point is attained as indicated by achieving a point of inflection in a curve of the reflectance values; and
   (c) continuing the heating of the solution until the hydrolysis is terminated.

2. The process of claim 1 in which the starting titanium sulfate solution has a concentration between about 100 and about 300 grams per liter, expressed as $TiO_2$.

3. The process of claim 1 in which the seeding in step (a) is performed by autonucleation.

4. The process of claim 1 in which the seeding in step (a) is performed by the addition of separately prepared titanium hydrolysis seed.

5. The process of claim 1 in which the hydrolysis in step (b) is carried out at a temperature between about 90° and about 100° C.

6. The process of claim 1 in which the starting titanium sulfate solution has a concentration between about 100 and about 180 grams per liter, expressed as $TiO_2$.

7. The process of claim 1 which further includes the steps of discontinuing the heating of the solution for a period from about 5 to about 60 minutes after the attainment of said critical point and then resuming and continuing the heating of the solution until the hydrolysis is terminated.

8. The process of claim 1 in which the starting solution has a sulfuric acid content sufficient to produce a ratio of $H_2SO_4/TiO_2$ between about 1.5 and about 2.5.

9. The process of claim 7 in which the further hydrolysis is performed by heating the solution at its boiling temperature.

10. The process of claim 7 in which the further hydrolysis is carried out at a temperature between about 90° and about 100° C.

11. The process of claim 7 in which the concentration of the solution during further hydrolysis is between about 140 and about 180 grams per liter, expressed as $TiO_2$.

12. The process of claim 7 in which the reflectance of the solution is also measured during further hydrolysis.

13. The process of claim 1 in which the reflectance values are plotted to form a reflectance curve to ascertain attainment of a point of infection therein, to control the hydrolysis.

14. The process of claim 1 in which a curve of the first derivative of the reflectance values with respect to time is utilized to obtain an indication of critical values, whereby to control the process.

15. In the process for the hydrolysis of a titanium sulfate solution for the production of titanium hydrate of pigment quality and which includes seeding of said solution by autonucleation or by the addition of separately prepared titanium hydrolysis seed and hydrolyzing the seeded titanium sulfate solution by heating the solution the improvement which comprises automatically controlling the hydrolysis by simultaneously measuring the luminous directional reflectance of the solution by photoelectric means, until a critical point is attained as indicated by achieving a point of inflection in a curve of the reflectance values.

16. The process of claim 1 in which a curve of the second derivative of the reflectance values with respect to time is utilized to obtain an indication of critical values, whereby to control the process.

17. The process of claim 15 in which a curve of the first derivative of the reflectance values with respect to time is utilized to obtain an indication of critical values, whereby to control the process.

18. The process of claim 15 in which a curve of the second derivative of the reflectance values with respect to time is utilized to obtain an indication of critical values, whereby to control the process.

References Cited

UNITED STATES PATENTS

| | | | |
|---|---|---|---|
| 2,253,595 | 8/1941 | Wood | 23—202 R |
| 2,452,390 | 10/1948 | Olson | 23—202 R |
| 3,062,673 | 11/1962 | Wigginton | 23—202 R |
| 3,071,439 | 1/1963 | Solomka | 23—202 R |
| 3,501,271 | 3/1970 | Twist et al. | 23—202 R |
| 3,615,204 | 10/1971 | Libera et al. | 23—202 R |

FOREIGN PATENTS

| | | | |
|---|---|---|---|
| 1,191,981 | 5/1970 | Great Britain | 23—202 R |

OTHER REFERENCES

"Titanium," 2nd Ed. (1966), by Jelks Barksdale, p. 296. The Ronald Press Co., New York.

EDWARD STERN, Primary Examiner

U.S. Cl. X.R.

23—230 A, 230 R, 253 A

UNITED STATES PATENT OFFICE
CERTIFICATE OF CORRECTION

Patent No. 3,706,829          Dated December 19, 1972

Inventor(s) M. M. Solomka Et Al.

It is certified that error appears in the above-identified patent and that said Letters Patent are hereby corrected as shown below:

Claim 13, column 6, line 11, change "infection" to --inflection--.

Signed and sealed this 3rd day of April 1973.

(SEAL)
Attest:

EDWARD M. FLETCHER, JR.　　　　　　　　ROBERT GOTTSCHALK
Attesting Officer　　　　　　　　　　　　Commissioner of Patents